(12) United States Patent
Ruppert

(10) Patent No.: US 12,068,649 B2
(45) Date of Patent: Aug. 20, 2024

(54) ELECTRICAL MACHINE WITH IMPROVED ELECTRICAL CONNECTION COOLING

(71) Applicant: Schaeffler Technologies AG & Co. KG, Herzogenaurach (DE)

(72) Inventor: Andreas Ruppert, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 276 days.

(21) Appl. No.: 17/629,869

(22) PCT Filed: Jun. 23, 2020

(86) PCT No.: PCT/DE2020/100530
§ 371 (c)(1),
(2) Date: Jan. 25, 2022

(87) PCT Pub. No.: WO2021/018337
PCT Pub. Date: Feb. 4, 2021

(65) Prior Publication Data
US 2022/0278578 A1    Sep. 1, 2022

(30) Foreign Application Priority Data

Jul. 29, 2019 (DE) ..................... 10 2019 120 412.7
Aug. 6, 2019 (DE) ..................... 10 2019 121 187.5

(51) Int. Cl.
*H02K 3/24* (2006.01)
*H02K 3/50* (2006.01)
(Continued)

(52) U.S. Cl.
CPC ................. *H02K 3/24* (2013.01); *H02K 3/50* (2013.01); *H02K 5/20* (2013.01); *H02K 9/193* (2013.01); *H02K 2203/09* (2013.01)

(58) Field of Classification Search
CPC .. H02K 3/24; H02K 3/50; H02K 5/20; H02K 9/193; H02K 2203/09; H02K 9/00; H02K 5/225
(Continued)

(56) References Cited

U.S. PATENT DOCUMENTS

| 5,664,916 A | 9/1997 | Link | |
|---|---|---|---|
| 2009/0025952 A1* | 1/2009 | Holmes | B60K 6/405 475/5 |
| 2012/0112573 A1* | 5/2012 | Chamberlin | H02K 11/33 310/59 |

(Continued)

FOREIGN PATENT DOCUMENTS

| CN | 104205581 A | 12/2014 |
|---|---|---|
| CN | 104426455 A | 3/2015 |

(Continued)

OTHER PUBLICATIONS

EP 3163721 (Year: 2015).*
(Continued)

*Primary Examiner* — Ahmed Elnakib

(57) ABSTRACT

An electrical machine, includes a machine housing containing: a stator, which has a winding comprising a plurality of conductors, which are associated with one or more phases and are interconnected; and a power connection, which is arranged outside the winding and has a number of line portions corresponding to the number of phases. The line portions are connected to the conductors and are connected to phase connections or form such. The line portions being at least partly accommodated in a connection housing, which has a cavity through which the line portions extend, which cavity communicates, after the connection housing has been inserted into the machine housing, with a coolant channel provided there, such that a coolant flowing in the coolant channel flows through the cavity.

9 Claims, 3 Drawing Sheets

(51) Int. Cl.
*H02K 5/20* (2006.01)
*H02K 9/193* (2006.01)

(58) Field of Classification Search
USPC .................................................. 310/54, 71
See application file for complete search history.

(56) References Cited

U.S. PATENT DOCUMENTS

| | | | | |
|---|---|---|---|---|
| 2014/0239750 A1* | 8/2014 | Nagao | ................... | H02K 5/203 |
| | | | | 310/43 |
| 2014/0265659 A1* | 9/2014 | Chamberlin | ......... | H02K 5/1732 |
| | | | | 310/54 |
| 2014/0319939 A1* | 10/2014 | Yamada | ................... | H02K 9/26 |
| | | | | 310/52 |
| 2018/0026493 A1* | 1/2018 | Jung | ........................ | H02K 5/24 |
| | | | | 310/52 |
| 2018/0270994 A1* | 9/2018 | Wang | .................... | H02K 11/33 |
| 2022/0278578 A1* | 9/2022 | Ruppert | ................... | H02K 3/50 |

FOREIGN PATENT DOCUMENTS

| | | |
|---|---|---|
| DE | 102014207468 A1 | 10/2015 |
| DE | 102016004936 A1 | 10/2017 |
| DE | 102019103191 A1 | 8/2020 |
| DE | 102019110868 A1 | 10/2020 |
| DE | 102019111825 A1 | 11/2020 |
| EP | 3163721 A1 | 5/2017 |
| JP | 2004215358 A | 7/2004 |
| JP | 2019054632 A | 4/2019 |
| WO | WO-2004077645 A1 * | 9/2004 ............ H02K 11/33 |
| WO | 2017055246 A2 | 4/2017 |

OTHER PUBLICATIONS

JP 2004215358 (Year: 2004).*
JP 2007166803 (Year: 2007).*
JP 2019054632 (Year: 2019).*

* cited by examiner

ELECTRICAL MACHINE WITH IMPROVED ELECTRICAL CONNECTION COOLING

CROSS-REFERENCE TO RELATED APPLICATIONS

This application is the U.S. National Phase of PCT Appln. No. PCT/DE2020/100530 filed Jun. 23, 2020, which claims priority to DE 102019120412.7 filed Jul. 29, 2019 and DE 102019121187.5 filed Aug. 6, 2019, the entire disclosures of which are incorporated by reference herein.

TECHNICAL FIELD

The disclosure relates to an electrical machine, having a machine housing containing a stator, which has a winding comprising a plurality of conductors, which are associated with one or more phases and are interconnected; and a power connection, which is arranged outside the winding and has a number of line portions corresponding to the number of phases, which line portions are connected to the conductors and are connected to phase connections or form such.

BACKGROUND

Electrical machines comprising a rotor and a stator are used in different areas of application. The use of electrical machines for electric hybrid vehicles and electric vehicles, or for hub drives is to be mentioned only as an example. If such an electrical machine is used as a drive machine, it is usually designed as an internal rotor, i.e., the stator surrounds the internal rotor. A moving magnetic field is generated via the stator, which causes the rotor to rotate. For this purpose, the stator has a winding consisting of a large number of conductors, wherein the conductors are assigned to one or usually more phases.

Not only the number of phases is included in the design of the winding geometry, but also the number of wires per phase as well as the number of wires per slot within the stator toothing and the number of pole pairs. This plurality of conductors and winding parameters creates a complex network of conductors that is built up using different winding technologies. Examples include hairpin or bar wave windings. Here, the conductors are formed by means of rods bent into a U-shape, which are put together to form a winding cage. The conductors are laid on a plurality of radial planes, wherein the conductors move from plane to plane, so to speak. To form these meandering, circumferential conductors, they are to be connected accordingly at their ends, which is usually done by welding the conductor ends that are adjacent to one another. The conductor ends converge at one point or on one winding side in the form of the so-called star, where they are connected to one another. In this area, the connection of the individual phases to an external power supply, i.e., a power connection, which is used to generate the magnetic field, must be made, which is often very difficult to implement for reasons of installation space. The individual phases of the winding are therefore supplied with power via this power supply or power connection in order to generate the moving magnetic field.

A central aspect in the conceptual design of an electrical machine, in particular the design in the winding area, is the cooling of the system itself. Because the more efficiently cooling can be implemented, the more efficient the overall system is. First and foremost, any power losses are to be minimized by means of a suitable design. However, it is often not sufficient to reduce or minimize these by a suitable construction, so that active direct cooling is required.

SUMMARY

The disclosure is based on the problem of providing an electrical machine with improved cooling.

To solve this problem, in an electronic machine of the type mentioned above, it is provided according to the disclosure that the line portions are accommodated in a connection housing at least partly which has a cavity through which the line portions pass and which, after insertion of the line housing into the machine housing, communicates with a coolant channel provided there, so that a coolant flowing in the coolant channel flows through the cavity.

In the electrical machine according to the disclosure, active cooling of the phase connections of the power connection, i.e., the high-voltage terminal, is provided, preferably in addition to basic cooling of the machine. The power connection or HV terminal usually has a number of line portions corresponding to the number of different phases, for example corresponding bus bars or similar, which have the input connection at one end and which are connected with their other end either directly or via suitable connecting conductors to the corresponding, phase-related conductors of the winding. This means that the operating current required to generate the magnetic field and thus to operate the electrical machine flows via these line portions. According to the disclosure, it is now intended to cool these line portions directly, at least partly, i.e., to implement an additional heat sink in the entire line.

For this purpose, according to the disclosure, the line portions are accommodated at least partly in a connection housing, for example a simple plastic housing, in which they are integrated accordingly and project at the end with corresponding connection portions for further contacting with the current input or the winding conductors. This connection housing, in which the line portions, i.e., the bus bars, or the like, are for example cast or injected, now has a cavity through which the line portions pass, i.e., they run freely through the cavity. In the assembly position, the connection housing is at least partially inserted into a corresponding receptacle of the machine housing. The machine housing itself has at least one coolant channel. This coolant channel now communicates with the cavity after the connection housing has been inserted, so that a coolant flowing or circulating in the coolant channel inevitably also runs through the cavity and thus comes into contact with the line portions, cooling them in the process. This means that the connection housing is integrated on the machine housing in such a way that it is integrated into the existing coolant circuit to consequently allow cooling of the line portions.

As described, the line portions are preferably cast in the connection housing and the cavity is formed in the casting. This is a simple way to ensure that the cavity is sealed to the connection housing. Alternatively, it would of course also be conceivable to lay the line portions separately in a housing component and seal the cavity accordingly.

For arrangement on the machine housing, a receiving space for the connection housing is preferably formed on the machine housing, wherein the coolant channel opens into the receiving space with an inlet and an outlet, and wherein an inlet and an outlet of the cavity of the connection housing communicate with the coolant channel after insertion into the receiving space. Consequently, when the connection housing is inserted with its corresponding section into the receiving space, the coolant channel opening in the receiving space is automatically connected to the cavity so that the coolant can flow. This design is very simple and compact, as the connection of the coolant channel, which is interrupted at the receiving space, with the cavity results inevitably and without additional assembly effort when the connection housing is inserted into the receiving space. Alternatively, it would of course also be conceivable not to integrate the connection housing into such a receiving space and instead to connect the coolant channel to the cavity via corresponding separate line connections.

In terms of cross-section, the cavity can correspond to the coolant channel cross-section, i.e., the coolant flows quasi directly through, merely passing and cooling the line portions in the process. As an alternative to this, however, it is preferably conceivable that the cavity has a larger inlet and outlet cross-section than the coolant channel. This means that the cavity is wider than the coolant channel, so that a certain amount of coolant can accumulate in the cavity. This is advantageous in that it creates turbulence within the cavity, which is beneficial for heat transfer from the hot line portions to the cold coolant.

In order to ensure that no leakage occurs in the area of the connection of the cavity to the coolant channel, according to an advantageous further development of the disclosure, one or more sealing means are preferably provided on the connection housing for sealing the cavity towards the machine housing. This or these sealing means, preferably at least one, in particular at least two sealing rings, ensure a secure and automatic seal, for example when the connection housing is inserted into the receiving space. In particular, they can be radially or axially acting sealing means or sealing rings.

The line portions themselves are provided with an insulating coating, at least in the area where they pass through the cavity, so that despite the smaller distance between the line portions, no short circuits occur and these cannot be caused by the coolant.

The line portions are preferably bus bars, i.e., stable, solid conductors with a sufficiently large surface area, which is advantageous for a good heat exchange.

If such bus bars are used, they are preferably rectangular in cross-section and arranged in the cavity such that their longer sides are parallel to the direction of flow of the coolant through the cavity. This means that the coolant flowing in from below, for example, flows against the narrow sides and then flows along the longitudinal sides through the cavity on the continued flow path.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
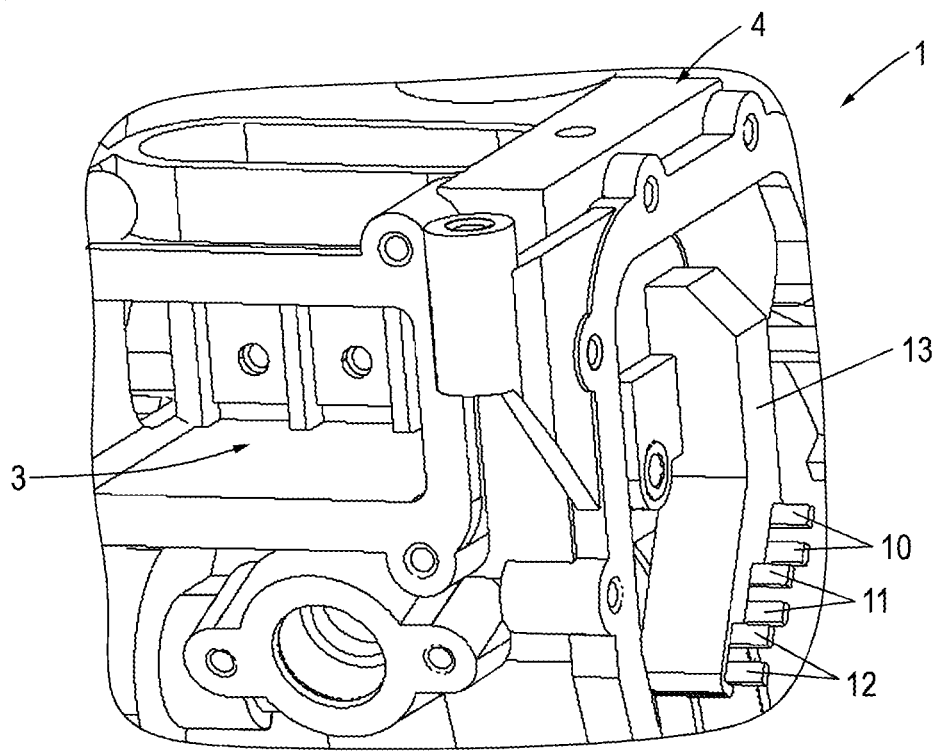
FIG. 1 shows a partial view of an electrical machine according to the disclosure with a power connection inserted in the machine housing.
Figure 2:
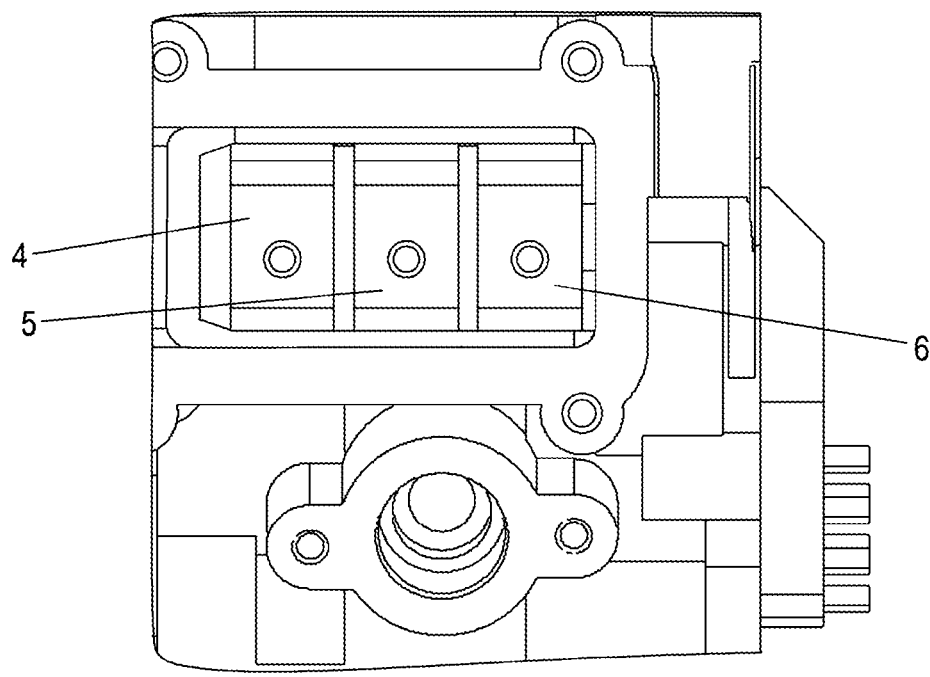
FIG. 2 shows a side view of the arrangement in FIG. 1.

FIG. 1 shows an electrical machine 1 according to the disclosure, with a machine housing 2, in which a stator with a winding comprising a plurality of conductors, which are associated with one or more phases and are interconnected, as well as a corresponding rotor, etc. are accommodated in a manner known per se. A power connection 3 with a corresponding number of phase connections 4, 5, 6 in the case of the 3-phase machine shown here is used to supply the winding conductors assigned to the different phases. The current is provided and regulated in a manner known per se via the so-called power electronics. The corresponding input conductors coming from the power supply are connected to the phase connections 4, 5, 6 shown in FIG. 2. The phase connections 4, 5, 6 are connected to or form part of corresponding line portions 7, 8, 9 (see, inter alia, FIG. 5), wherein the line portions 7, 8, 9 extend in the direction of the winding and at the end have further phase connections 10, 11, 12, which are provided here in pairs, or branch into them. The line portions 7, 8, 9 are preferably one-piece bus bars having all phase connections 4, 5, 6 and 10, 11, 12.

The power connection 3 also has a connection housing 13, which is a cast housing made of plastic. This means that the line portions 7, 8, 9 are cast into this plastic connection housing 13 and firmly embedded in the casting compound. The connection housing 13 has a geometry corresponding to the shape of the line portions 7, 8, 9, wherein the line portions 7, 8, 9 are correspondingly angled several times due to the position of the phase connections 4, 5, 6 and 10, 11, 12.

Figure 3:
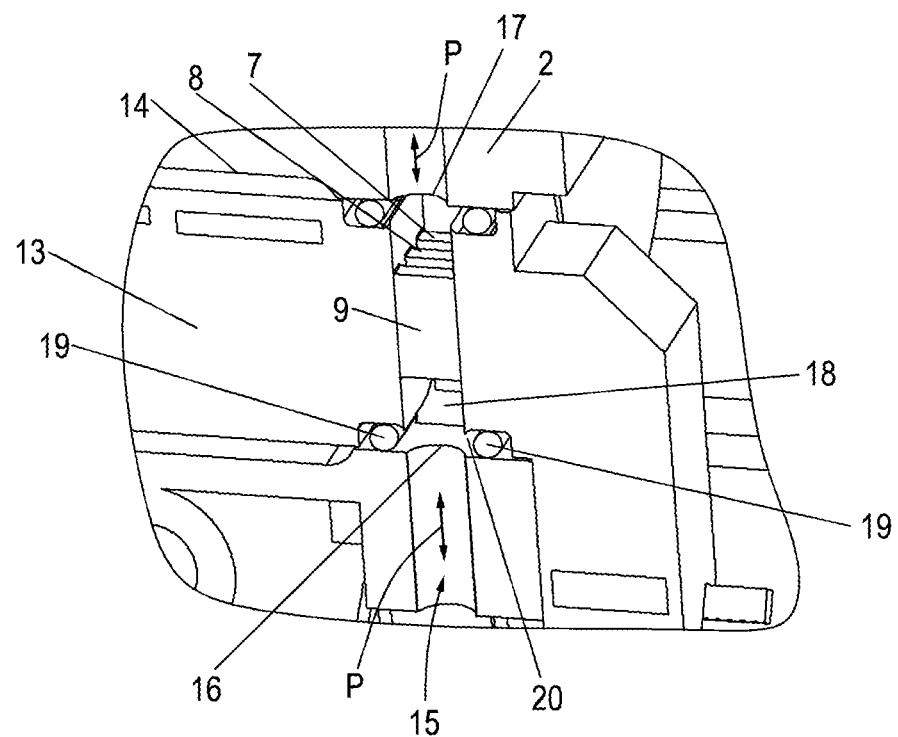
FIG. 3 shows a sectional view from FIG. 1 through the motor housing and the connection housing to show the cavity and the line portions passing through it as well as the coolant channel.

In the assembly position—see the sectional view according to FIG. 3, which shows a sectional view through the machine housing 2 as well as the connection housing 13—[the connection housing] is inserted into a corresponding receiving space 14 formed in the machine housing 2, wherein this receiving space 14 is open at the front and towards the side (see FIG. 1) in order to provide the corresponding connection joints.

A coolant channel 15 is formed in the machine housing 2, which is part of a cooling system through which a coolant circulates. The coolant can be oil, water, a gas or another cooling medium. This coolant channel 15 opens with an inlet 16 at or in the receiving space 14, as well as with an outlet 17, as FIG. 3 shows. The two flow arrows P indicate by way of example that the coolant flows through the coolant channel 15.

Figure 4:
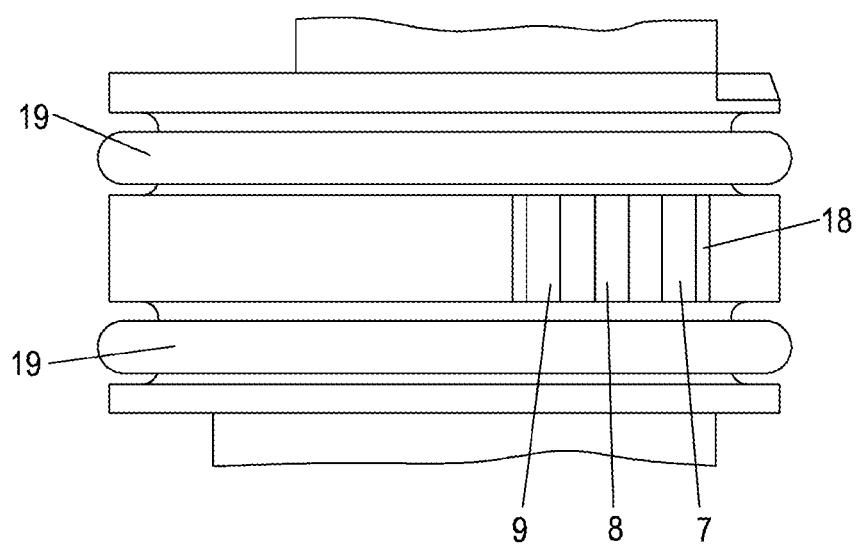
FIG. 4 shows a partial view of the power connection from above.
Figure 5:
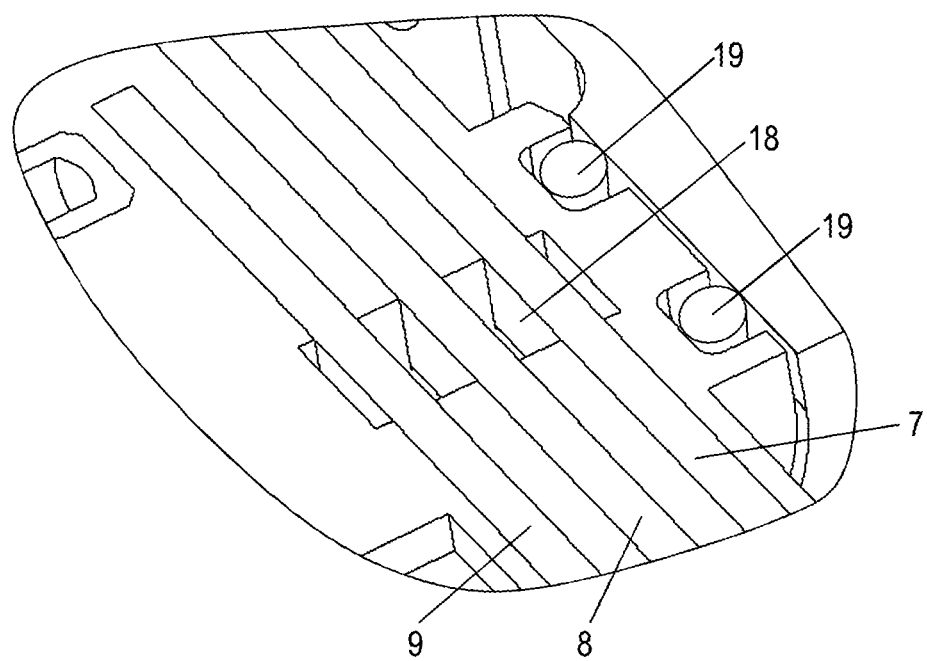
FIG. 5 shows another (cut) partial view of the power connection.

As FIG. 3 further shows, the cast connection housing 13 has a cavity 18 open on two opposite sides, which, see also FIGS. 4 and 5, is penetrated by the line portions 7, 8, 9, which thus extend transversely through the cavity 18. Their narrow sides are perpendicular to the flow direction according to arrow P, while their flat long sides are parallel to it.

The cavity 18, which is open on both sides, communicates with a corresponding input and output with the corresponding input and output 16, 17 of the coolant channel 15, as FIG. 3 shows. This means that the coolant flows out of the coolant channel 15 into the cavity 18, flows past the line portions 7, 8, 9, cooling them in the process, and exits the cavity 18 into the coolant channel 15 on the opposite side.

Two sealing means in the form of sealing rings 19 are provided for sealing the cavity 18 to the machine housing 2, which, see in particular FIG. 3, seal towards the machine housing 2. They run annularly in a corresponding receiving groove 20 of the connection housing 13 around the latter and lie against the inner wall of the receiving space 14 of the machine housing 2 in a fully sealing manner. This prevents the coolant from leaking. Although radially acting sealing rings 19 are shown in the example, other types of sealing rings, in particular axially acting sealing rings, can also be used. If the same oil is used as coolant as in the electrical machine, only one sealing ring is sufficient, as then sealing is only required towards the power electronics, but not towards the electrical machine.

Figure 6:
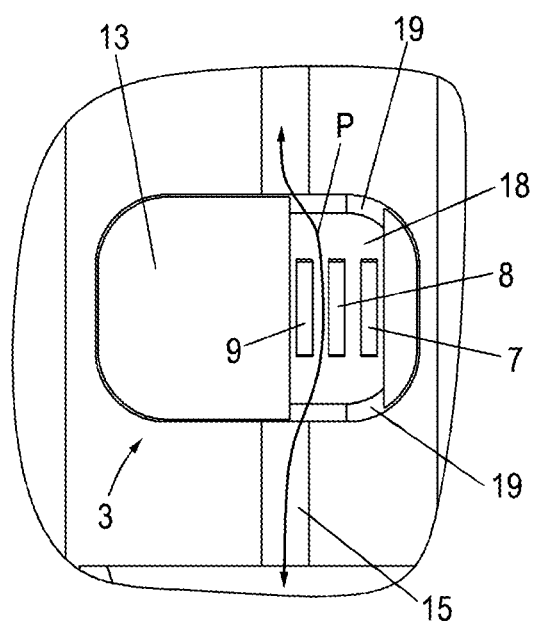
FIG. 6 shows a schematic view of the fluid flow through the cavity in the connection housing.
Figure 7:
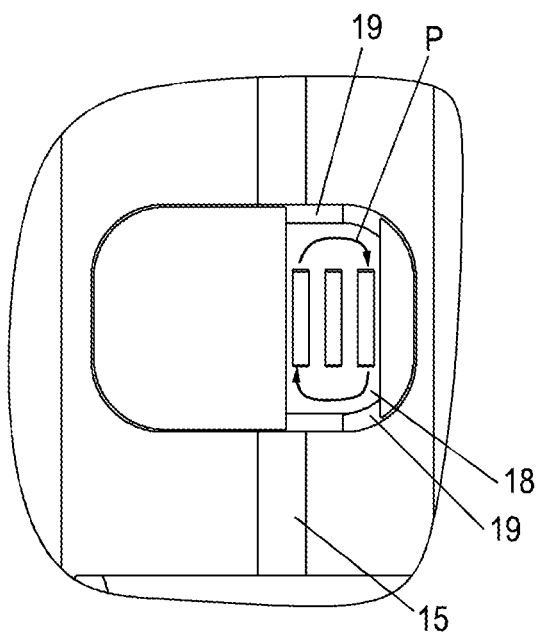
FIG. 7 shows a schematic view of the circulation of the coolant.

FIGS. 6 and 7 show a sectional view through the power connection 3, respectively the connection housing 13 and the cavity 18. As also shown by the double arrow P here, the primary direction of flow in this case is vertically through the cavity 18 and along the longitudinal surfaces of the line portions 7, 8, 9. However, as FIG. 7 shows, there is also circulation, as shown by the arrows P there, resulting from the fact that due to a slight offset of the cavity 18 relative to the coolant channel 15, the coolant is not supplied exactly centrally, but slightly off-center. In addition, there is also turbulence due to the line portions 7, 8, 9 integrated in the cavity 18.

The line portions 7, 8, 9 are preferably made of copper, but can also be made of another material. They are preferably provided with a suitable coating in order to prevent possible short circuits due to insufficient distance or creepage distances.

Although three line portions 7, 8, 9 and thus three separate phases are shown in the exemplary embodiment, it is equally conceivable to realize more or fewer phases, resulting in a correspondingly different number of line portions being provided in the power connection 3 that cross the cavity 18.

LIST OF REFERENCE NUMBERS

1 Machine
2 Machine housing
3 Power connection
4 Phase connection
5 Phase connection
6 Phase connection
7 Line portion
8 Line portion
9 Line portion
10 Phase connection
11 Phase connection
12 Phase connection
13 Connection housing
14 Receiving space
15 Coolant channel
16 Inlet
17 Outlet
18 Cavity
19 Sealing ring
20 Receiving groove

The invention claimed is:

1. An electrical machine, comprising: a machine housing containing a stator, which has a winding comprising a plurality of conductors associated with one or more phases that are interconnected; and a power connection, arranged outside the winding and having a plurality of line portions corresponding to a number of phases, wherein the line portions are connected to the conductors and are connected to phase connections, the line portions being at least partly accommodated in a connection housing having a cavity through which the line portions extend, wherein the cavity communicates, after the connection housing has been inserted into the machine housing, with a coolant channel, such that a coolant flowing in the coolant channel flows through the cavity, wherein a receiving space for the connection housing is formed in the machine housing, wherein the coolant channel opens into the receiving space with an inlet and an outlet, and wherein an inlet and an outlet of the cavity of the connection housing communicate with the coolant channel after insertion into the receiving space.

2. The electrical machine according to claim 1, wherein the line portions are cast in the connection housing and the cavity is formed in the casting.

3. The electrical machine according to claim 1, wherein the cavity has a larger inlet and outlet cross-section than the coolant channel.

4. The electrical machine according to claim 1, wherein one or more seals for sealing the cavity towards the machine housing are provided on the connection housing.

5. The electrical machine according to claim 4, wherein the one or more seals includes at least two sealing rings.

6. The electrical machine according to claim 4, wherein the one or more seals includes one or more radially or axially acting sealing rings.

7. The electrical machine according to claim 1, wherein the line portions are provided with an insulating coating at least in a region passing through the cavity.

8. The electrical machine according to claim 1, wherein bus bars are provided as line portions.

9. The electrical machine according to claim 8, wherein the bus bars are rectangular in cross-section and are arranged in the cavity such that their longer sides are parallel to a direction of flow of the coolant through the cavity.

* * * * *